(12) United States Patent
Kosakowski et al.

(10) Patent No.: US 9,341,494 B2
(45) Date of Patent: May 17, 2016

(54) APPARATUSES AND METHODS FOR MANAGING ROUTE NAVIGATION VIA MOBILE DEVICES

(75) Inventors: Martin Kosakowski, Bochum (DE); Roland Schink, Recklinghausen (DE); Ernst Zielinski, Bochum (DE)

(73) Assignee: Nokia Technologies Oy, Espoo (FI)

( * ) Notice: Subject to any disclaimer, the term of this patent is extended or adjusted under 35 U.S.C. 154(b) by 2605 days.

(21) Appl. No.: 12/004,566

(22) Filed: Dec. 21, 2007

(65) Prior Publication Data

US 2009/0164115 A1  Jun. 25, 2009

(51) Int. Cl.
G01C 21/34  (2006.01)
G01C 21/36  (2006.01)
G01S 19/34  (2010.01)

(52) U.S. Cl.
CPC .......... *G01C 21/3641* (2013.01); *G01C 21/367* (2013.01); *G01S 19/34* (2013.01)

(58) Field of Classification Search
USPC .......... 701/201, 207, 209, 210, 211; 455/456.1, 456.2, 456.3, 456.4, 457
See application file for complete search history.

(56) References Cited

U.S. PATENT DOCUMENTS

| | | | |
|---|---|---|---|
| 5,473,324 A | 12/1995 | Ueno | |
| 6,249,740 B1 | 6/2001 | Ito et al. | |
| 6,304,818 B1 * | 10/2001 | Kamiya | 701/200 |
| 6,604,045 B2 | 8/2003 | Kuroda et al. | |
| 6,636,805 B1 | 10/2003 | Tada et al. | |
| 6,978,209 B2 * | 12/2005 | Nakahara et al. | 701/209 |
| 7,012,564 B2 * | 3/2006 | Abraham | 342/357.68 |
| 7,177,762 B2 * | 2/2007 | Bruelle-Drews | 701/211 |
| 7,216,034 B2 | 5/2007 | Vitikainen | |
| 7,359,713 B1 * | 4/2008 | Tiwari | 455/456.1 |
| 7,389,179 B2 * | 6/2008 | Jin et al. | 701/207 |
| 7,395,152 B2 * | 7/2008 | Watanabe et al. | 701/209 |
| 7,430,473 B2 * | 9/2008 | Foo et al. | 701/212 |
| 7,756,638 B2 * | 7/2010 | Hoashi | 701/211 |
| 7,831,349 B2 * | 11/2010 | Jeong | 701/36 |
| 2001/0027375 A1 | 10/2001 | Machida et al. | |
| 2003/0093217 A1 | 5/2003 | Petzold | |
| 2004/0048620 A1 | 3/2004 | Nakahara et al. | |
| 2004/0153370 A1 | 8/2004 | Yang | |
| 2006/0064241 A1 | 3/2006 | Rasmussen et al. | |

(Continued)

FOREIGN PATENT DOCUMENTS

WO  WO 2007/026046  3/2007

OTHER PUBLICATIONS

Partial European Search Report for related European Patent Application No. 08 020 963 dated Dec. 10, 2012, pp. 1-5.

(Continued)

*Primary Examiner* — Thomas G Black
*Assistant Examiner* — Peter D Nolan
(74) *Attorney, Agent, or Firm* — Ditthavong & Steiner, P.C.

(57) ABSTRACT

Apparatuses and methods for managing route navigation via mobile devices. A route is calculated between a starting point and a destination point. The route is divided into multiple segments based on the complexity of the calculated route, and navigation features are controlled as a function of the segment that corresponds to the user's current location. The user may opt to identify one or more segments, or one or more route portions independent of whether or not segmentation has occurred, in order to specify a portion(s) of the route where navigation support is not needed.

46 Claims, 7 Drawing Sheets

(56) References Cited

U.S. PATENT DOCUMENTS

| | | | |
|---|---|---|---|
| 2007/0067097 A1* | 3/2007 | Haatainen | 701/208 |
| 2007/0285311 A1* | 12/2007 | Abraham | 342/357.12 |
| 2008/0167797 A1* | 7/2008 | Geelen et al. | 701/200 |
| 2008/0167801 A1* | 7/2008 | Geelen et al. | 701/201 |
| 2010/0123623 A1* | 5/2010 | Abraham | 342/357.12 |

OTHER PUBLICATIONS

Extended European Search Report for corresponding European Application No. 08020963.8, dated May 23, 2014, 10 pages.

European Office Action for related European Patent Application No. 08020963.8-1557 dated Nov. 20, 2015, 8 Pages.

* cited by examiner

APPARATUSES AND METHODS FOR MANAGING ROUTE NAVIGATION VIA MOBILE DEVICES

FIELD OF THE INVENTION

This invention relates in general to mobile navigation, and more particularly to apparatuses and methods for managing power consumption and improving navigational usability of mobile devices.

BACKGROUND OF THE INVENTION

Navigational technologies have evolved rapidly in recent years. For example, positioning systems such as the Global Positioning System (GPS) utilize satellite technology to enable people around the world to ascertain their current position and accurately navigate from one location to another. Other technologies are also used to determine an approximate location of a device user, such as mobile/cellular infrastructures that maintain a current location of communication devices carried by device users. These and other technological advances in navigation have in many cases supplanted printed maps, and have also enabled people to navigate between virtually any locations that would otherwise be unfamiliar to the navigator.

Location technologies (e.g. GPS, cellular, etc.) are in use in mobile devices. For example, automobiles may be equipped with GPS or other location devices to enable drivers to navigate along routes stored in accompanying software. Hand-held mobile devices may also be equipped with GPS or other location technologies, and in most cases inherently exhibit location abilities due to cellular/mobile infrastructure location tracking. Mobile device users can utilize navigation software facilitated by these location technologies. In the case of hand-held mobile devices, device users can take advantage of these navigation capabilities while on foot, while cycling, while driving an automobile, and so forth. For example, a user of a device equipped with such navigation capabilities can view a walking route, see his/her current location, and determine where he or she would like to travel.

The mobile devices in which such navigational capabilities are implemented are by nature limited devices compared to fixed and/or wired processing counterparts such as desktop computers. For example, a mobile phone is intended to be a small, convenient communication tool that can be carried by users, and notwithstanding the obvious benefits of such devices, mobile devices do not share the screen size, memory capabilities, or power considerations as fixed computing/communication devices. Power consumption is of particular interest in mobile device design, as battery size and discharge characteristics (e.g., processing intensity, talk time, standby time, etc.) impact the convenience and usefulness of such mobile devices.

In the case of mobile devices equipped with navigational devices, users often want to use the navigation system for relatively lengthy periods of time. A walker may want to use the navigation system for the entire day without changing or recharging the battery. Navigational features such as processor usage, display time and intensity, data communication (e.g. transceiver) time, etc. consumes power and can directly impact the available battery time. If the user uses the device and navigation system too long, the battery will lose power to the point that the device and/or navigation system can no longer be utilized until recharged.

Another issue with navigation systems is that they may provide visual and audio cues along the route. In many cases this is desirable, as the user welcomes the assistance provided by the navigation system. However, there may be times when the user is well aware of where he/she is located, and where he/she is going, and continual cues from the navigation system may be unnecessary and even annoying.

Accordingly, there is a need for manners of improving power efficiency of mobile devices employing navigation functionality. There is also a need to improve user usability of navigation features and feedback. The present invention fulfills these and other needs, and offers numerous advantages over the prior art.

SUMMARY OF THE INVENTION

To overcome limitations described above, and to overcome other limitations that will become apparent upon reading and understanding the present specification, the present invention discloses systems, apparatuses and methods for managing power consumption, reducing costs, and/or improving navigational usability of mobile navigation devices.

In accordance with one embodiment of the invention, a method is provided that involves calculating a route between a starting point and a destination point, dividing the route into multiple segments based on the complexity of the calculated route, and controlling a navigation feature(s) as a function of the segment that corresponds to the user's current location. In one embodiment, computer-readable media is provided having instructions stored thereon that are executable by a processing system for such a method.

According to a more particular embodiment, the method further includes enabling the user to identify one or more of the segments in which the controlling of the route navigation feature(s) is overridden and one or more of the navigation features are functionally reduced, or suspended. Another embodiment involves determining the complexity of the calculated route by identifying multiple route types along the calculated route, where dividing the route involves designating each of the segments as a portion of the calculated route having a contiguous, common route type. In another embodiment, dividing the route into multiple segments involves dividing the route into multiple segments based on an extent of curvature of the calculated route.

In one embodiment, dividing the route into multiple segments based on a complexity of the calculated route involves identifying the complexity of the calculated route by identifying distinguishable route types along the calculated route, and grouping substantially contiguous spans of the route having common route types to form each of the segments of the calculated route. In an alternative embodiment, the extend of curvature along the calculated route is identified, the complexity of the calculated route is determined by establishing distinguishable levels of the curvature along the calculated route, and dividing the route into multiple segments based on the complexity of the calculated route involves dividing the route into substantially contiguous segments corresponding to the established distinguishable levels of the curvature.

Another embodiment of the method involves dividing the route into multiple segments based on the number of intersections that intersect or otherwise traverse the calculated route. In another embodiment, controlling the route navigation feature(s) involves deactivating one or more route presentation or generation features on a segment-by-segment basis.

In one embodiment of the method, controlling the route navigation feature(s) involves controlling operation of a display. For example, this may involve turning the display off or reducing its brightness. An audio interface may be utilized at any time, and in one embodiment is utilized when the display is turned off.

In still other embodiments of such a method, controlling the route navigation feature(s) involves reducing the power consumption of components involved in navigation feature(s). Another example of controlling the navigation feature(s) involves increasing the time interval between positioning system tracking operations. Still another example involves controlling processing resources involved in presenting the calculated route to a user.

One embodiment of the method involves placing visual indicia along the route, where the number of the visual indicia placed in each segment is proportional to the complexity of the calculated route at the respective segment. In yet another embodiment, the method further includes calculating user velocity, and performing GPS location updates at a rate proportional to the velocity of the user. "Proportional" as used herein does not require (but may exhibit) linear proportionality, but rather may involve non-linear proportionality.

In accordance with another embodiment of the invention, a method is provided that involves calculating a route between a starting point and a destination point, receiving a user-specified identification of one or more parts of the route to be subject to limited navigation support, applying the limited navigation support to the one or more parts identified for limited navigation support, and applying a standard navigation support to the one or more parts not identified for limited navigation support. In one embodiment, computer-readable media is provided having instructions stored thereon that are executable by a processing system for such a method.

According to a more particular embodiment, the method further includes dividing the route into multiple segments. In such a case, receiving a user-specified identification of the part(s) of the route involves receiving a user-specified identification of one or more of the plurality of segments to be subject to the limited navigation support. In a more particular embodiment, dividing the route involves dividing the route into the plurality of segments based on the complexity of the calculated route, where applying a standard navigation support is then based on the complexity of the respective segment.

In another embodiment of the method, receiving a user-specified identification of a part(s) of the route involves receiving a user-specified identification of the part(s) of the route to be subject to the limited navigation support during the user's movement along the route.

Another embodiment involves applying the limited navigation support by deactivating a display that presents the route.

Still another embodiment of such a method involves facilitating user entry of the user-specified identification of the parts of the route that are to be subject to limited navigation support. Another embodiment involves facilitating user-controlled toggling between applying the limited navigation support and the standard navigation support.

Exemplary embodiments of applying limited navigation support includes suspending operation of a display for purposes of navigating the route, reducing the brightness of a visual presentation on a display for purposes of navigating the route, reducing the power consumption of components involved in the at least one navigation feature, reducing or suspending navigation feedback associated with the navigation feature(s), and increasing the time interval between positioning system tracking operations.

In accordance with another embodiment of the invention, an apparatus is provided that includes at least a user interface, a navigation module, and a location identification module. Such modules may be, for example, discrete components, processor-implemented modules, etc. In one embodiment, the user interface is configured to facilitate user entry of at least a route destination. The navigation module is configured to calculate a route between a route origin and the route destination, and to divide the route into multiple segments based on a complexity of the calculated route. The location identification module is configured to identify the user's location along the route. The navigation module is further configured to control at least one route navigation feature as a function of the segment in which the user is currently located.

According to more particular embodiments of such an apparatus, the navigation module may be configured to determine the complexity of the calculated route by identifying multiple route types along the calculated route, and to divide the route by designating each of the segments as a portion of the calculated route having a contiguous, common route type. In another embodiment, the navigation module is configured to divide the route into the plurality of segments based on an extent of curvature of the calculated route.

In yet another embodiment of such an apparatus, the location identification module is implemented as a global positioning system (e.g. GPS) module capable of communicating with global positioning system infrastructure to identify the user's location as a function of latitude and longitude.

Another embodiment of the apparatus involves a display to present at least the calculated route and the user's location along the route, where the route navigation feature(s) includes the presentation of the calculated route and the user's location along the route, and where the navigation module is configured to control the presentation on the display as a function of the segment in which the user is currently located. Another embodiment involves an audio output(s) to audibly present at least instructions for traveling the calculated route, where the route navigation feature(s) includes the presentation of the instructions, and where the navigation module is configured to control the instructions from the audio output as a function of the segment in which the user is currently located. In another embodiment, the route navigation feature(s) includes position tracking along the route, where the navigation module is configured to control the position tracking by the location identification module.

The location identification module may be further configured to establish the route origin based on the user's current location, where the navigation module is configured to calculate the route between the route origin established by the location identification module and the route destination entered via the user interface. In an alternative embodiment, the user interface is further configured to facilitate user entry of the route origin.

In accordance with another embodiment, an apparatus is provided that includes a navigation module, a user interface, and a processing module. The navigation module is configured to calculate a route between a route origin and a route destination. The user interface is configured to receive a user-specified identification of one or more parts of the route to be subject to limited navigation support. The processing module is configured to apply the limited navigation support to the one or more parts identified for limited navigation support, and to apply a standard navigation support to the one or more parts not identified for limited navigation support.

According to a more particular embodiment of such an apparatus, the navigation module is further configured to divide the route into a plurality of segments, where the user interface is configured to receive a user-specified identification of one or more of the plurality of segments to be subject to the limited navigation support. In another embodiment, the user interface is configured to receive the user-specified identification of the one or more parts of the route to be subject to limited navigation support during the user's movement along the route, where the processing module is configured to apply the limited navigation support or the standard navigation support depending on a state of the received user-specified identifications.

In various embodiments, the user interface further includes a user interface mechanism(s) to facilitate user-controlled toggling between applying the limited navigation support and the standard navigation support. In another embodiment, a display is provided, and is configured to present at least the calculated route, where the processing module is configured to limit visual presentations by the display when limited navigation support is applied. In another embodiment, one or more transceivers are provided to communicate information over-the-air, where the processing module is configured to limit communications by one or more of the transceivers when limited navigation support is applied.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

Figure 1:
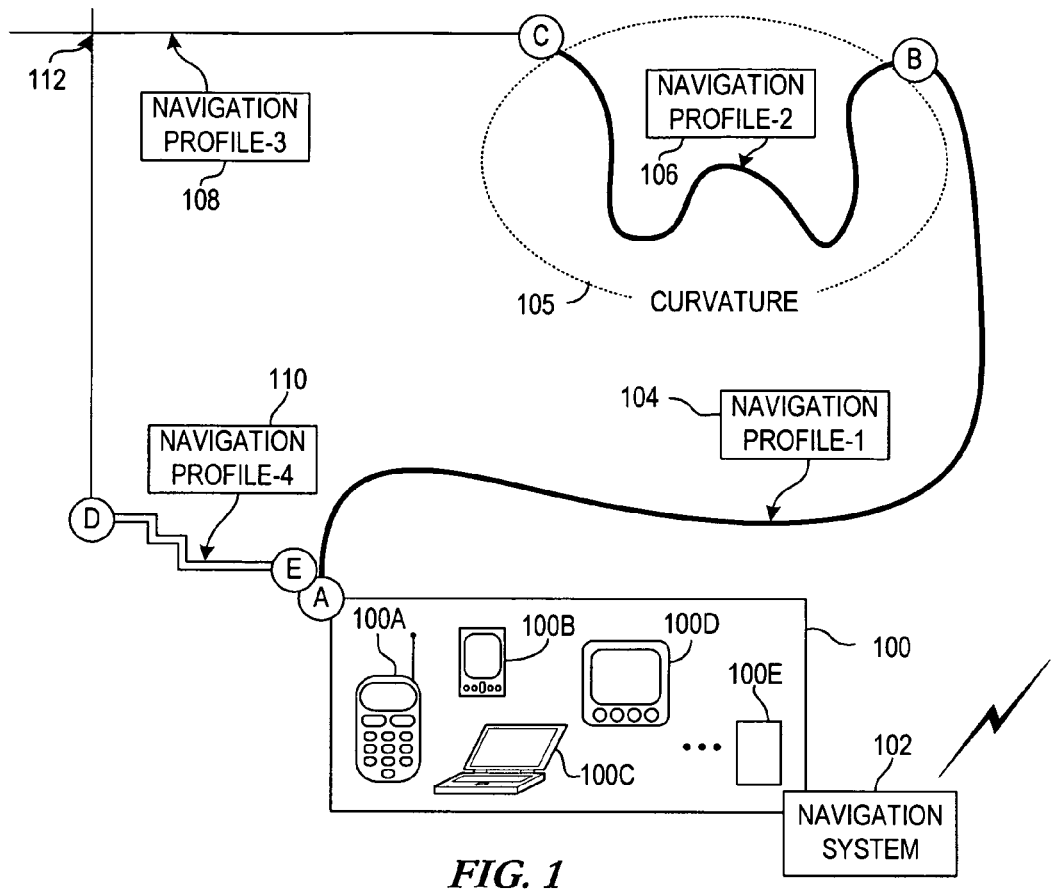
FIG. 1 generally illustrates a representative manner of controlling route navigation features based on route complexity in accordance with the present invention.

DETAILED DESCRIPTION OF EMBODIMENTS
OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides for efficient utilization and management of power consumption for mobile navigation devices. The invention provides for more intelligent and timely use of navigation system features on mobile devices. For example, the invention can increase battery runtime of the mobile device through the use of power management features implemented during the mobile navigation process. As power consumption is important factor in the usability of mobile devices, minimizing power consumption during times when navigation system features are less necessary, or unnecessary, is greatly beneficial. Further, the invention provides facilitates controllability of navigation system feedback, as there may be times where the user is not interested in obtaining instructions from the navigation system that would otherwise be provided anyway. Other costs may also be avoided with the use of the present invention, such as connection costs if the mobile device needs to connect to an external source. For example, some or all of the route display and/or route calculations is performed external to the mobile device, such as with an online route guidance system. In such cases the mobile device needs to communicate with the external server to communicate information. Costs for the connection and/or data transfer can be minimized through the judicial use of navigation resources in accordance with the invention. The invention provides these and other advantages as will become apparent to those skilled in the art from the description provided herein.

One embodiment of the invention generally involves controlling a route navigation feature(s). For example, a route between starting and destination points can be calculated. This route is then divided into multiple segments, based on the complexity of the calculated route. One or more navigation features are then controlled as a function of the segment that corresponds to the user's (and consequently the device's) current location. For example, if the device user is currently located in a segment resulting from the route division that is deemed a segment of lower complexity, one or more navigation features may be temporarily shut down or "reduced" in their capabilities. Analogously, a navigation feature(s) may be turned on, increased in use frequency, increased in use duration, and/or the like while in segments of higher complexity.

In one embodiment the user may be sufficiently familiar with one or more of route segments such that the user himself/herself does not need navigation system feedback while traveling those route segments. One feature of the present invention enables the user to selectively identify one or more segments in which navigational assistance is not needed, or alternatively those segments in which navigational assistance is needed. While associated with segments where the user has indicated that navigational assistance is not needed, power consumption and/or navigational feedback can be reduced or eliminated until a new segment is reached where the user has indicated that navigational assistance is desired. In one embodiment, this user designation of familiar routes can override or otherwise take precedence over other established levels of navigational assistance, such as that based on the complexity of the route. By way of example, the user can designate a segment(s) as a known area which shuts down or reduces navigational assistance in that area, even if the route was determined to be "complex" and would otherwise provide a relatively higher level of navigational assistance.

FIG. 1 generally illustrates a representative manner of controlling route navigation features based on route complexity in accordance with the present invention. The embodiment of FIG. 1 relates to the controllable use of a local navigation system based on the user's need and/or desire for navigational assistance. The intensity of the navigation support is dependent on the complexity profile of the particular route at issue.

As will be described in greater detail, each calculated route is divided into segments, representing certain route complexities, which corresponds to respective levels of navigation support. As the display of the mobile device is a primary power consumer in a mobile navigation system, the display can be used only when it is really needed/desired rather than continuously. Other representative navigational features in addition to such visual display presentations that can be controlled to assist in the reduction of power consumption and/or navigational feedback include position tracking transceivers (e.g. GPS receiver), audio presentations, processing intensity (e.g. how hard the processing system is working on navigation-related activities), suspending online route guidance systems (if used), etc. Thus, a tradeoff can beneficially be made between navigational guidance and the reduction in power consumption and/or navigational feedback.

The embodiment of FIG. 1 relates to users of mobile devices, whether the mobile device is specifically a navigational device or a multi-purpose device equipped with navigational capabilities. The mobile device 100 of FIG. 1 illustrates representative mobile devices that serve as navigation devices in accordance with the invention, including mobile phones 100A, personal digital assistants 100B, laptop or other portable computing devices 100C, specific navigation devices 100D such as a GPS device used in an automobile, and/or any other 100E mobile devices capable of supporting navigational systems. Such other mobile devices may include a portable game device, a portable camera/camcorder, a portable audio/video device, a portable AM/FM/Digital radio device, a portable television device, a wrist watch, etc.

The representative mobile device 100 includes a navigation system 102. The navigation system 102 can be any known or future system capable of identifying the absolute or relative position of the user device. Generally, the navigation system represents a location or position identifier that operates with current or future positioning infrastructure to identify the location of the user. The navigation system also includes mapping or routing software so that the user's location can be correlated to a route(s) or otherwise referenced to a map.

For example, one implementation of the navigation system 102 is in the context of satellite-assisted position determination systems, such as Galileo or global positioning system (GPS) technology. In such systems, the approximate position of the user can be determined if the user is equipped with a satellite signal receiving device, such as a GPS device. Where the user has a GPS device in his/her possession, the user's absolute position based on latitude and longitude can be determined. If a distance traveled is desired, the user's absolute position can be compared to a reference point such as the user's starting point. Thus, GPS may be used to calculate a distance traveled, by comparing a current location with a reference location (e.g., starting location), or may be used to pinpoint a user's location using the GPS coordinates. The user can travel in any manner, including but not limited to walking, jogging or other personal physical movement, or utilizing a device or machine such as a bicycle, automobile, boat, aircraft, personal transporter such as a Segway™, or any other vehicle. It should be noted that other location identification system and/or modules capable of determining a user's location, other than GPS, may analogously be used in accordance with the present invention. One alternative is a triangulation using mobile network access points, wherein location information of a mobile communication device is determined in the network and transmitted back to the mobile communication device and/or stored in the network for further use. Reference is made to GPS technologies herein, but it should be recognized that this is merely for ease of description, and the description is equally applicable to any similar positioning technology.

A route is calculated between a starting point and destination point. The starting point may be entered by the user, or can be determined by the positioning system. In the illustrated embodiment the starting point is identified as point A. A destination point is then entered. For example, the user could enter point B as a destination, and a route would be calculated from point A to point B. In the illustrated embodiment, the user designates the destination point (E) at or near the starting point A. This may be the case for a walker, jogger, biker, etc., where a person wants to travel a route and return to the starting point A. In one embodiment the navigation system may calculate the shortest route between the starting and destination points. In other embodiments, the user can designate one or more points along the desired route to provide guidance as to the approximate or precise route to be taken. Thus, when calculating a route between a starting point and a destination point, this does not necessarily imply that one or more intermediate points are not designated. In other words, calculating the route between the starting and destination points may, or may not, involve calculating that route based on user designation or other variables identifying one or more intermediate points to provide some guidance as to the route to be traveled. In other embodiments the user may not know anything about the route, and designates only the destination point, whereby the entire route is calculated by the navigation system. The present invention is equally applicable to user-influenced routes or system-generated routes.

The route in FIG. 1 is determined to be from point A to point E (which may correspond to the starting point A), following the depicted path. This calculated route is divided into multiple "segments," where the division of the route into segments is based on the complexity of the route. The factors are considered in determining the complexity of the route may be inherent to the navigation system 102, such as predetermined complexity profiles programmed into the navigation system 102. The complexity factors may alternatively, or additionally, be specified by the user. Representative examples of complexity factors include the type of route or pathway involved, the degree of angular deviation from linear paths (e.g. curvature of the route), the quantity of intersections which could cause navigational confusion to the user, and the like.

For purposes of facilitating an understanding of this aspect of the invention described in FIG. 1, the complexity of the route in FIG. 1 is determined based on two factors: the route type and curvature. Particularly, the navigation system 102 considers the route types and curvature of the calculated route, which in one embodiment is based on specified criteria. For example, the specified criteria may include an analysis of the calculated route to determine whether the curvature of the path exceeds a specified angular deviation from a linear path, and/or whether multiple "curves" exist in the path, which ultimately warrants that portion of the route being divided into a segment of a particular complexity. In the illustrated embodiment, the specified criteria also includes the route type such as motorway/freeway, country road, city road, hiking trail, etc.

The division of the calculated path in the example of FIG. 1 results in four segments. The first segment is between point A and point B, and represents a particular route type such as a hiking trail. The second segment is between point B and point C, and represents a segment having curvature exceeding a specified curvature threshold. The third segment is between point C and point D, and represents another particular route type such as a country road (e.g. an unpaved road). The fourth segment resulting from the route division is between point D and point E (or point A), and represents another particular route type such as city roads.

At least one route navigation feature can be controlled as a function of the segment corresponding to the user's current location. For example, each of the different segments can be associated with a navigation support level. Segments of higher complexity can be associated with higher navigation support levels (i.e. having higher navigational guidance), where segments of lower complexity can be associated with lower navigation support levels (i.e. having lesser navigational guidance). Some segments may be associated with the same navigation support level, even though they are deemed to have different segment complexities. This could occur where, for example, the number of different levels of complexity exceeds the number of different levels of navigation support. In other embodiments each different level of complexity may be associated with a different level of navigation support.

The example of FIG. 1 involves a different level of navigation support for each segment having a different complexity. The various navigation support levels are depicted as navigation profiles, including navigation profile-1 104 on segment A-B, navigation profile-2 106 on segment B-C, navigation profile-3 108 on segment C-D, and navigation profile-4 106 on segment D-E. Thus, while any one or more of these segments A-B, B-C, C-D, D-E may or may not have different navigation profiles, the example of FIG. 1 involves each segment having a different complexity and being associated with a different navigation profile.

An operational example is now described in connection with FIG. 1. For purposes of this example, the following correlations between segment complexities and navigation profiles are assumed:

and/or other feedback to be audibly presented, and the GPS tracking frequency is based on the velocity of the user. Such a navigation profile can be defined in any desired manner. For example, the display may be turned on periodically along the route, but turned on at a lesser intensity or brightness. The representative navigation profile-1 104 is based on the fact that the user may be hiking and it is unnecessary or inconvenient to view a display, so power is saved by turning the display off for this route segment. The audio may be turned on to give audible instructions. Tactile feedback such as device vibration may be turned on to notify the user of impending audible instructions, so the user knows to listen for instructions. The frequency of GPS tracking is based on the velocity of the user, which can be approximately determined in various manners, including determining the time between any two or more GPS positioning events.

It is then assumed that the user enters a portion 105 of the route that has been segmented based on a curvature complexity factor. For example, the segment B-C results from that portion 105 of the path having a medium route curvature which results in adjusting the power and/or navigation feedback features to correspond to navigation profile-2 106. This exemplary navigation profile-2 involves turning the display on at or near sufficiently significant curves on the route. This assumption may be based on the fact that users may want greater navigational support where the route is no longer straight and could cause greater navigational confusion or anxiety while traveling that portion of the route. The exemplary navigation profile-2 may also keep navigational audio on, and base GPS tracking on both the user's velocity and route curvature.

Segment C-D was also formed from the division of the route into segments, and in the illustrated example is based on a route type complexity factor. The exemplary segment C-D is a country road having a navigation profile-3 108. This

TABLE 1

| COMPLEXITY | NAVIGATION PROFILE | CHARACTERISTICS |
|---|---|---|
| Route Type-A: hiking trail | Navigation Profile-1 | display off; audio on; tactile feedback on; GPS tracking based on velocity |
| Route Type-B: country road | Navigation Profile-3 | display on at intersections; audio on; GPS tracking based on velocity |
| Route Type-C: city road | Navigation Profile-4 | display, audio, and GPS tracking on continuously |
| . | . | . |
| . | . | . |
| . | . | . |
| Curvature: medium | Navigation Profile-2 | display on at curves; audio on; GPS tracking based on velocity and curvature |
| . | . | . |
| . | . | . |
| . | . | . |

Any number of navigation profiles may be utilized for any number of determined route complexities. Each navigation profile may be defined as desired. Those listed in Table 1 above are provided for purposes of example only.

Based on the example of Table 1 and FIG. 1, the user starts at starting point A and travels along the segment A-B. This portion of the route has been segmented as segment A-B based on the road type being a hiking trail. Navigation profile-1 104 has been associated with this segment complexity, and thus power consumption and/or navigation feedback is adjusted to account for the complexity of this segment. In the illustrated embodiment, a hiking trail is associated with navigation features (e.g. a navigation profile) that result in turning off the display, turning audio features on to enable directions representative profile has, for example, characteristics of turning on the display near intersections 112, turning audio on, and basing GPS tracking on the user's velocity.

Finally, the illustrated example includes segment D-E, also based on a route type complexity factor. In this instance, the segment D-E includes city roads having a navigation profile-4 110. In inner-city areas, the route may change often and thus a processing-intensive profile may be appropriate. Navigation profile-4 110 in the illustrated example includes keeping the display, audio and GPS tracking on continuously while in this segment.

The above example shows a representative manner in which a route can be calculated, divided into segments based on the complexity of the calculated route, and where one or more route navigation features can be controlled as a function of the segment in which the user is currently traveling. Such a system may be particularly beneficial to users on foot such as walkers, joggers, and cyclists who want to use the navigation system for extended periods of time without changing or recharging the battery on their mobile device. Automobile and other vehicle users can also benefit from the invention. For example, many drivers use mobile navigation systems in their cars. By using the smart power management of the present invention, navigation feedback can be controlled, and power management can benefit users where on-board supply systems are used.

Further, many drivers use mobile navigation systems in their automobiles, where power is provided to the mobile navigation system using a cable, such as through a cigarette lighter receptacle. The user is required to purchase or otherwise obtain the cable, and also to contend with the cable being present within the car. Disadvantages of using such a cable include the cost and inconvenience of purchasing of the cable, the inconvenience of having the cable attached and laying in the car interior, and the adverse affect on the aesthetic appearance inside the passenger compartment with the cable. The use of a power cable can be minimized or eliminated using the present invention, where power consumption is limited such that the mobile navigation device can operate for extended periods of time without requiring charging.

Figure 2:
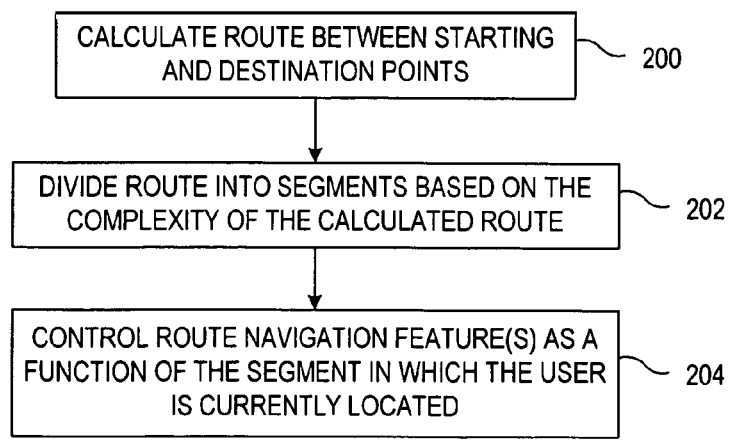
FIG. 2 is a flow diagram generally illustrating one embodiment of a method for providing navigation support dependent on the route complexity in accordance with the invention.

As can be seen, the extent of the navigation support can be made to be dependent on the complexity of the selected route. FIG. 2 is a flow diagram generally illustrating one embodiment of a method for providing such navigation support in accordance with the invention. A route is calculated 200 between starting and destination points. As previously indicated, the designation of the destination point may be made through user input. Designation of the starting point may be performed by the user's positioning system or through user input. Further, the route from the starting point to the destination point may be made entirely by the navigation system, or may include some guidance by the user such as selecting one or more intermediate points in which the route is to traverse. The route is then divided 202 into multiple segments based on the complexity of the calculated route. One or more navigation features are then controlled 204 as a function of the segment in which the user is currently located.

Figure 3A:
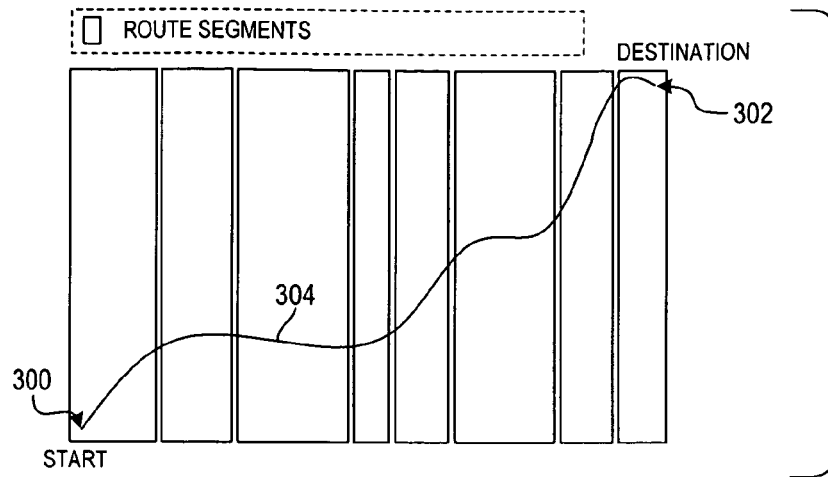
FIGS. 3A, 3B and 3C illustrate a representative use case for managing power and/or usability in a mobile navigation device in accordance with the invention.
Figure 3B:
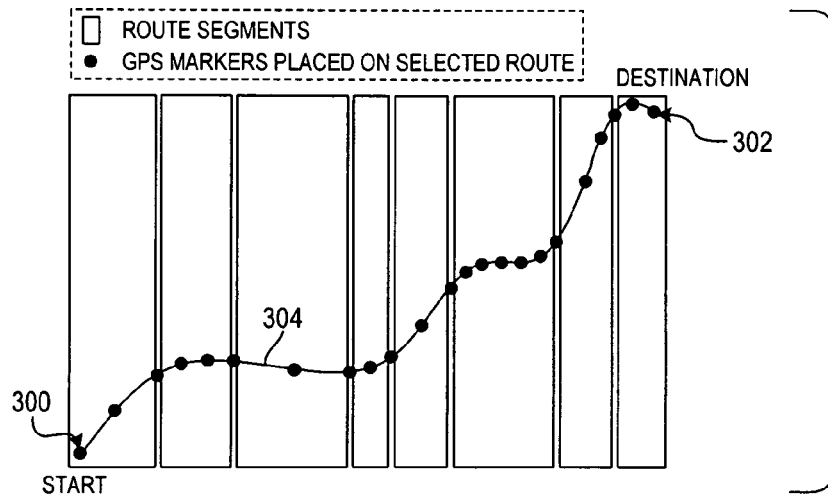
Figure 3C:
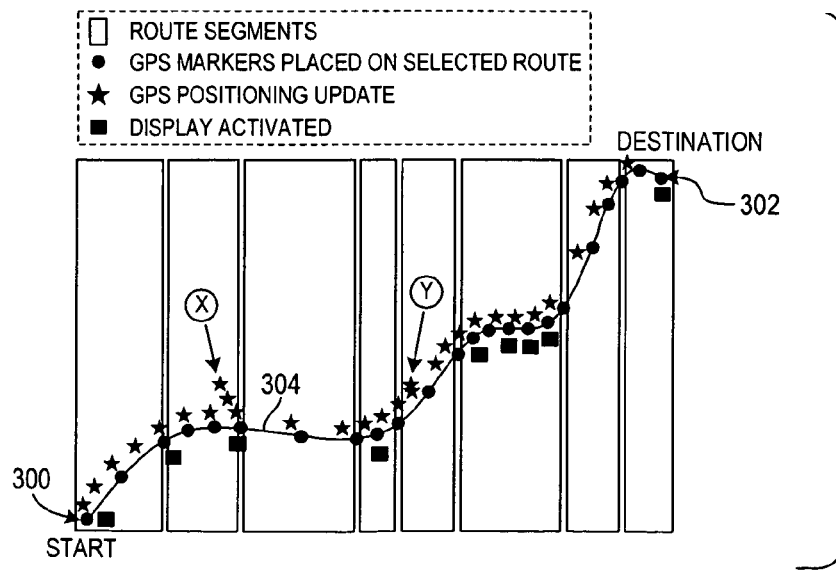

FIGS. 3A, 3B and 3C illustrate a representative use case for managing power and/or usability in a mobile navigation device in accordance with the invention. In the example of FIG. 3A, the user's start location is known and the user enters the destination location to the mobile device. The route 304 is then calculated between the starting 300 and destination 302 points. The navigation module divides the selected route 304 into segments. In various embodiments the complexity analysis may be performed prior to the segmentation, or after the segmentation. Each segment is analyzed in terms of navigation complexity. Depending on the complexity of the route 304, a number of GPS "on track" markers are placed as shown by the dots in FIG. 3B. In one embodiment more markers are placed in complex route segments, and fewer are placed in less complex route segments. Thus, in one embodiment, the quantity of the markers or other visual indicia placed in each segment is proportional to the complexity of the calculated route at the respective segment. It should be noted that "proportional" does not require (but may exhibit) linear proportionality, but rather suggests that generally as the complexity rises, so will the quantity of marker placements. Complexity may be based on any desired criteria, such as route type, curvature, etc. For example, when a portion of the route is very simple such as a long street with no intersections, the navigation support can be reduced to a minimum as no navigation support is needed. In such a case position tracking may be performed in wide time intervals. In one embodiment, the more difficult the routing, the shorter the time interval between adjacent GPS positioning points.

While the user travels the route, velocity estimations may be performed between adjacent GPS positioning points. The time intervals between adjacent GPS position points may be chosen as a function of the velocity of the user; e.g. the higher the user velocity, the shorter the time interval of GPS updating. Thus, performing GPS location updates can be performed at a rate at least in part proportional to the velocity of the user. It should be noted that "proportional" in this context does not require (but may exhibit) linear proportionality, but rather suggests that generally as the user velocity increases, so may the rate of GPS location updates. FIG. 3C illustrates representative GPS positioning updates as depicted by the star symbols along the route 304. In this manner, even when the user gets off track as depicted at location "X," the time until the navigation system will recognize the problem can be short, such as on the order of 1 to 30 seconds depending on the user's motion velocity. In such case the navigation system will bring the user back on track quickly.

When the GPS position of the user does not change significantly, or no GPS measurements are possible over a certain time (e.g. a minute), assumptions may be made such an assumption that the user stopped traveling to take a rest. The navigation system can communicate this assumption to the user via the audio and/or visual interfaces. In one embodiment the system can ask the user if the system can switch into a sleep mode or other reduced capacity until the user re-activates the system. In such a state even GPS tracking can be minimized or temporarily suspended. This can further save power particularly where the user stops for a considerable time.

To conserve power, the display of the navigation device can be deactivated much of the time, until it is deemed to be needed. FIG. 3C depicts exemplary display activation times with a black square. When the user is still on the right track, there is little or no need for the display to be on. In one embodiment, relevant information is given to the user via an audio interface while the display is off. The display can be turned on to support the navigation process in response to certain circumstances, such as when the route becomes more difficult or "complex," when the user selectively causes the display to turn on, etc. The limited use of the display and discrete use of the GPS positioning significantly reduces the power consumption of the navigation system.

In the case of foot travelers, cyclists and other non-motorized vehicle users, power savings can be significant such that the battery runtime can be increased from a number of hours to more than a complete day. As merely a representative example, a typical use example may result in activation of the display may be decreased to about 20% of the use time, and the GPS tracking reduced to about 50% of the use time. This merely represents an example, and these percentages may be increased or decreased depending on the complexity of the calculated route.

In an automotive example, the navigation system display can be used little or shut off completely while the driver is on motorways or country roads, and any needed information can be provided, for example, via audio. Further, the GPS tracking interval can be increased depending on the driver velocity and the road's complexity; e.g. greater GPS tracking and audio guidance near intersections, less GPS tracking and audio guidance when the source of the road is simple. In city traffic, the display and GPS tracking features may be used often, or continuously, as the car velocity relative to the route complexity may be quite high.

Other navigational features may be shut off, suspended or otherwise limited in some fashion. For example, some mobile navigation systems use online route guidance. The user can communicate start and destination points of a route to a service provider that returns at least the calculated route to the mobile device. The online service may include costs to the user, such as service costs, connection fees, data fees, etc. Thus, in addition to reducing power consumption and/or reducing temporarily unwanted navigation feedback, the present invention also helps the user in situations such as where online navigation services are utilized. More particularly, some or all of the route display and/or route calculations may be performed external to the mobile device, such as with an online route guidance system. In such cases the mobile device needs to communicate with the external server to communicate information. Costs for the navigation service, connection and/or data transfer can be minimized through the selective use of navigation resources in accordance with the invention. Thus, when the route guidance is shut off, suspended or otherwise limited, not only can the route presentation or tracking be reduced or suspended, so too can the service provider connection to reduce costs. When the navigation system returns to a standard navigation support mode following a period of limited navigation support, the service can be re-established. In one embodiment, route updates from an external navigation system can be turned back on only if the user deviates from the calculated route by some threshold distance or other threshold event, or if the user specifically requests updated route information. In other embodiments, communication with an external navigation system can resume in response to reaching a point on the path that is subject to navigation support.

Figure 4:
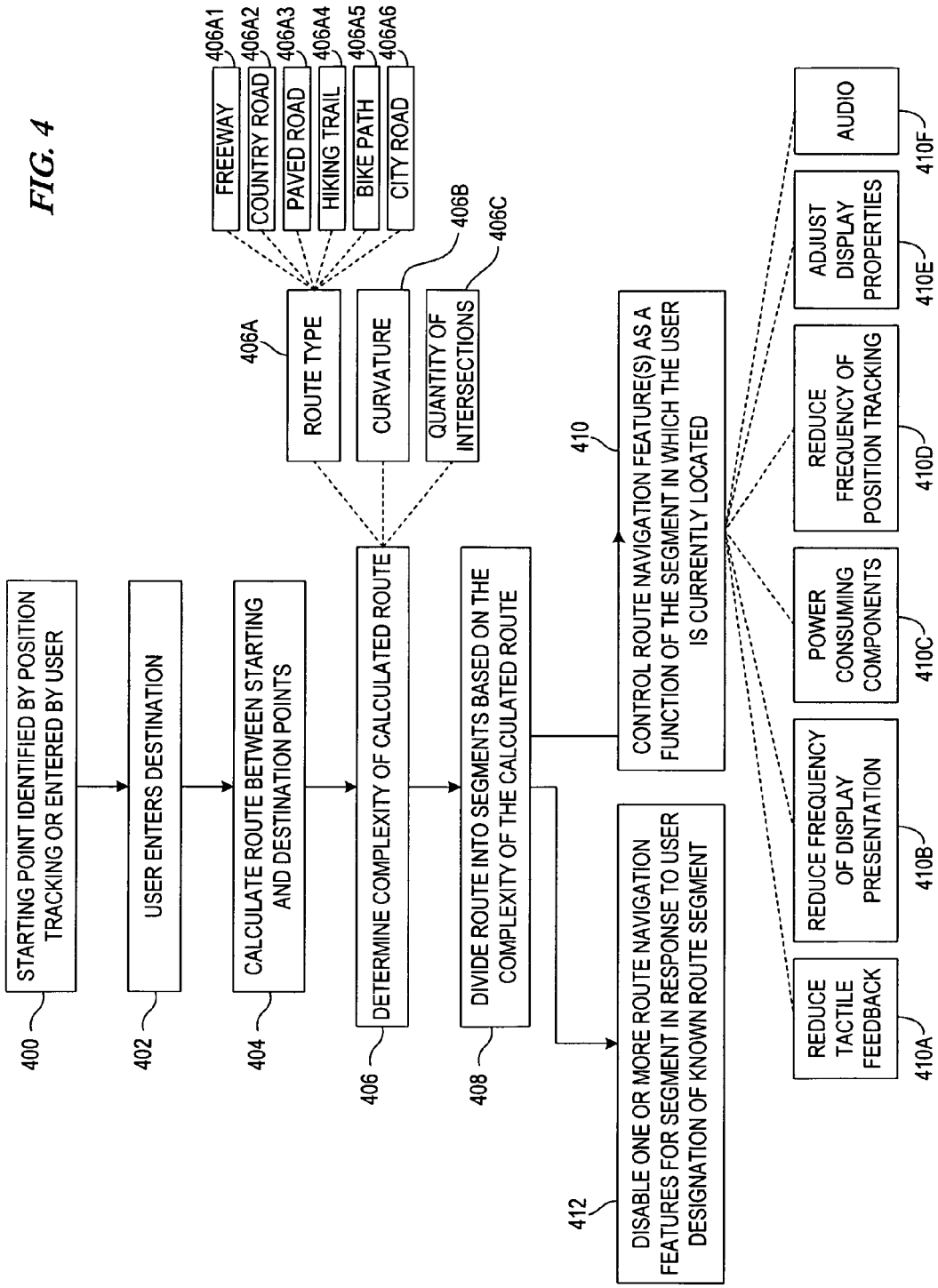
FIG. 4 is a flow diagram illustrating other alternative embodiments of methods for facilitating navigation support according to the invention.

FIG. 4 is a flow diagram illustrating various representative embodiments of a method for facilitating navigation support according to the invention. The starting point is identified 400 by position tracking or entered by the user, and the user enters 402 the destination. The route is calculated 404 between the starting and destination points. The complexity of the route is calculated 406. This may be performed prior to or after dividing 408 the route into segments. The complexity may be determined based on various criteria, such as the route type 406A, curvature 406B of the path, number of intersections 406C, etc. As an example, the route type 406A may relate to different road/trail types such as a freeway 406A1, country road 406A2, paved road 406A3, hiking trail 406A4, bike path 406A5, city road 406A6, etc.

The route is divided 408 into multiple segments based on the complexity of the calculated route. In one embodiment, one or more route navigation features are controlled 410 as a function of the segment where the user is located. Representative route navigation features include any one or more of reducing (including eliminating) tactile feedback 410A, reducing the frequency of display presentations 410B, reducing processing of power consuming components 410C, reducing the frequency of position tracking 410D, adjusting display properties 410E (e.g. brightness, resolution, etc.), selectively using an audio interface 410F, etc.

In accordance with one embodiment of the invention, the user can influence or override existing navigation profiles for particular segments, or may specifically designate navigational features for one or more segments. For example, the user may disable 412 one or more route navigation features for a segment(s) in response to the user indicating that he/she is familiar with that segment(s) and requires no navigational support. While one such embodiment is shown at block 412, the following further describes this and other related embodiments.

It is often the case that when a navigation system is used, the user knows at least some portion of the route. For example, if a device user employs navigation services when walking, cycling, driving or otherwise traveling from her home to various destinations, it is likely that she is familiar with at least the portion of the route that are close to her home. During this time, however, the navigation system may present the route on the user's device display, and/or may provide navigational cues or instructions along the way. If the user knows a portion of the route, activating the navigation system during this time merely consumes additional device power, and may also provide unnecessary (and possibly annoying) route instructions.

Another issue is that the navigation system may calculate a particular route that includes a portion that is well-known to the user. The user, knowing a better route through that region, will therefore intentionally deviate from the calculated route of the navigation system. In response to the user's deviation from the calculated route, the navigation system may provide specific instructions to get the user back on the calculated route, and/or intensity its standard navigation support during this route deviation. The navigation system may even attempt to re-calculate the route and provide new navigation instructions. These and similar situations result in even greater power expenditures and navigational feedback at a time when the user may in fact not need or want navigational support.

The present invention addresses these situations by facilitating optional user indication of one or more segments of a calculated route to exhibit different navigational support than the segment would otherwise have. Selective navigation support based on the user's knowledge of the route can thereby be accomplished. For example, a "guide me from here" navigational feature is made possible through this aspect of the invention, where the user designates which part(s) of the route that navigation support is to start and/or end. After the usual route calculation by the navigation system, if desired the user may select or otherwise designate one or more portions of the route where he/she would like assistance with navigating the route. The designated portion(s) may be that created via the segmentation of the route as described above, or may identified on the route itself such as by specifying the portion(s) via a user interface.

Equipped with this feature, a user traveling along a well-known part of the route can significantly conserve device power and avoid unnecessary navigation feedback. The "well-known" portions of the route can be associated with a navigation profile(s) which, for example, turns off the display, reduces GPS tracking frequency, etc. In one embodiment the GPS tracking frequency is reduced, but not turned off so that the "guide me from here" feature is not missed when guidance is subsequently needed. Thus, when the user reaches a route portion that has not been designated as "known" to the user, the navigation system activates to a default navigation setting or other navigation profile associated with that new portion. It should be noted that what is designated as "known" to the user also includes a portion(s) of the route that the user is simply not interested in obtaining navigation support, whether or not that portion of the route is actually familiar to the user. For example, the user may not be familiar with an area, but may want to travel around that area for pleasure or to obtain familiarity with that area. In such cases the user can designate that area to be disregarded in the navigation, which can have the same effect on navigation support as if the user was familiar with the area and designated it as such.

Figure 5:
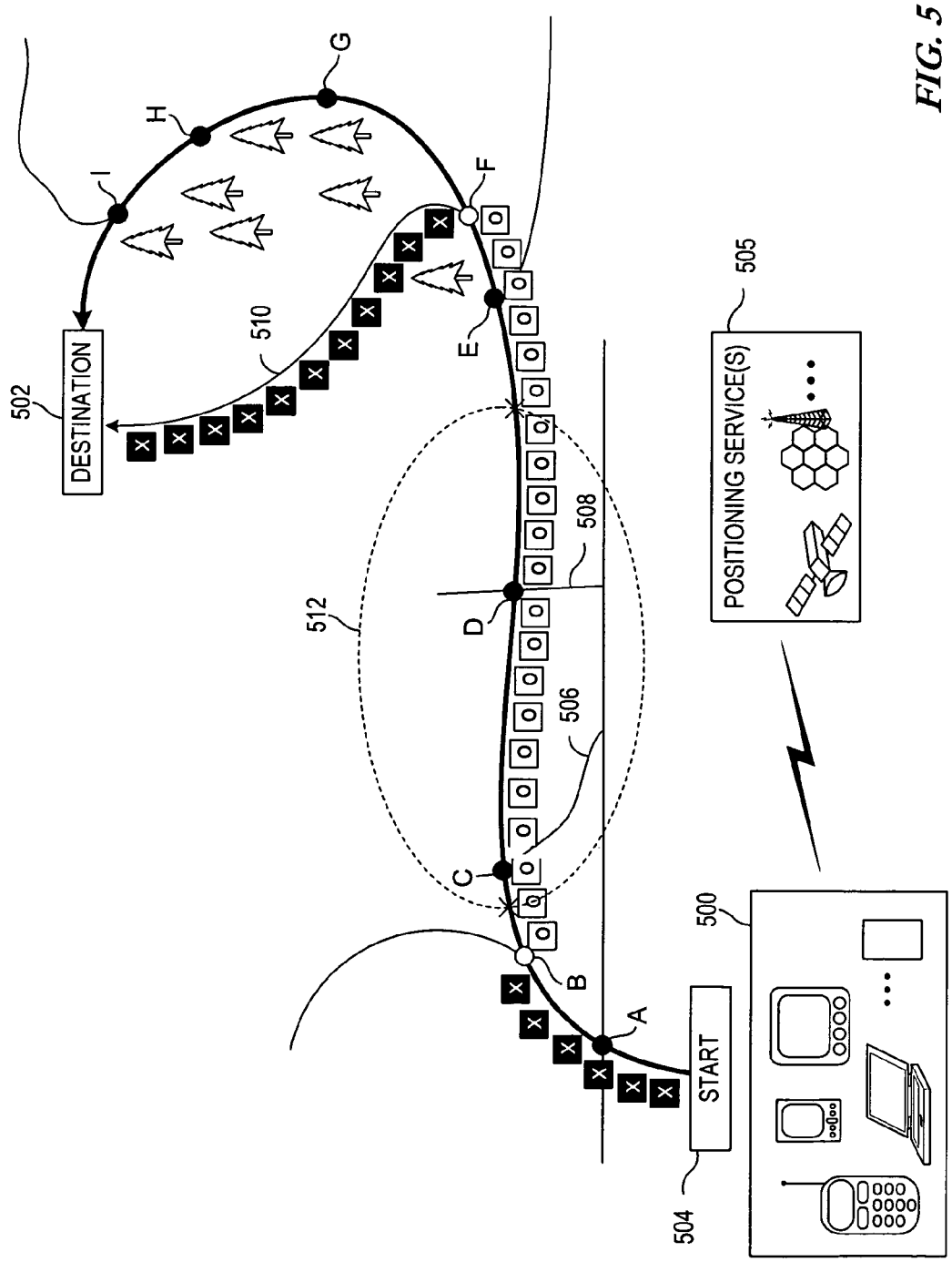
FIG. 5 is a diagram illustrating a representative embodiment of a manner for facilitating user designation of at least one portion of a route to be disregarded for purposes of navigation processing.

FIG. 5 is a diagram illustrating a representative embodiment of a manner for facilitating user designation of at least one portion of a route to be disregarded for purposes of navigation processing. The mobile device 500 represents the user device that includes the navigation capability. The map(s) may be generated locally, or may be generated externally (e.g. at a map server) and obtained at the mobile device 500 via a wireless/mobile network(s). The user designates at least a destination point 502 on a presented map provided by the navigation module. The starting point 504 may be determined via the positioning technology 505 or designated by the user. A route is calculated between the starting 504 and destination 502 points.

In accordance with one embodiment of the invention, the route is divided into route segments. This segmentation can be accomplished as described in connection with FIGS. 1-4. Alternatively, the route may be divided in different manners, such as being segmented at intersections with other roads. Further, as described more fully below, the route may be segmented by the user himself/herself by designating one or more points along the route via a user interface.

In the illustrated embodiment the route is divided into segments demarcated by the segments between the starting point 504, points A-I, and destination point 502. For example, the first segment is the Start-A segment, the second segment is the A-B segment, and so forth. Some segments may start or end at an intersection, such as segment C-D which starts at an intersection with path 506 and ends at an intersection with road 508. Other segments may be created by the user, or by other criteria such as route curvature as depicted by segments including points G and H.

One or more portions of the route may be known to the user so that navigation services are not needed, or the user may simply not want to utilize navigation services on one or more portions of the route. In accordance with the invention, the user can designate one or more portions of the route to temporarily suspend, or at least reduce, navigation support. In the illustrated embodiment, the user is familiar with the portion of the route represented by segments Start-A and A-B. The user informs the navigation system that navigation support is to be suspended (or reduced to a lesser level of support) while the user travels along these segments. This is depicted by the dark squares marked with an "x," meaning that the user has informed the navigation system that navigation support for these segments is to be suspended. When the user reaches a portion of the route that has not been designated as a known area, as determined by the positioning services 505, the navigation support resumes normally. In the illustrated example, this occurs when the user reaches point B, and the navigation support is operative until point F. This is depicted by the light squares marked with an "o."

The user may be aware of a path(s) from one route point to another route point that is different from the route calculated by the navigation system. For example, between points F and the destination 502, the navigation system may have calculated the route from points F to G to H to I and ultimately to the destination 502. The user may know that a different route 510, from point F to the destination, is a better or otherwise more desirable route to take to the destination. In the same manner that the user designated segments Start-A and A-B as "known," the user can designate segments F-G, G-H, H-I and I-Destination as known segments. Accordingly, the navigation support is suspended when the user reaches point F, and the user can take the alternate path 510 to the destination without consuming device battery and processing resources, and without having to be subjected to navigation feedback or route re-calculations from the navigation system.

The user can notify the navigation system of known segments in various manners. For example, the user can select one or more segments created by the navigation system via a user interface. The selected segment(s) can be designated as segments that are known to the user (i.e., no navigation support is needed), or alternatively the user can designate those segments in which navigation support is desired.

In another embodiment, the user selects a point on the route which serves as an indicator to guide the user from that point forward. This "guide me from here" feature can be used after the route has been calculated. This embodiment may be used whether or not a segmentation of the route has occurred. In one embodiment, such a feature can be toggled by the user. For example, after the route has been calculated, the user can perform a user interface action that initially turns off most of the navigation features, with the exception of occasional GPS tracking. The occasional GPS tracking continues to enable the system to know the location of the user to provide navigation support when the user subsequently requests it. As the user travels along the route with most navigation features disabled, the user can reach a point where navigation support is desired. The user can then perform a user interface action to activate the navigation support features. In this manner, the user can enable and disable navigation support when desired, yet the navigation system is aware of the entire route and the position of the user regardless of whether or not the navigation support is currently being used by the user. In one embodiment, the user interface provides a single button, switch, etc. which enables the user to toggle between these active and inactive periods of navigation support. However, any user interface mechanisms may be employed.

Still other embodiments do not require any segmentation of the route. For example, the route may be calculated, and the user simply identifies a part(s) of the route to distinguish between parts to be subject to, and not subject to, the navigation support. For example, the user can pick two points on the route, and the part of the route between those two selected points can be the part subject to (or alternatively not subject to) navigation support. These do not have to (but they may) fall on segment boundaries, or they can be selected without any segmentation performed at all. Another representative example involves other user interface mechanisms, such as creating an area 512 or "spanning a window" around the part(s) of the route to be distinguished from another part(s) of the route. In this fashion, the user does not select pre-established segments, but rather demarcates the part(s) of the route in which navigation support is needed and/or not needed. In cases where segmentation has occurred, one embodiment involves the user overriding any segmentation with the user's specific designation of a part(s) of the route to be considered for limited (including no) navigation support. It should be noted that any user interface mechanism may be used by the user to specify which part(s) of the route will be subject to (and consequently not subject to) navigation support, including but not limited to graphical input, textual input, voice input, etc.

Figure 6:
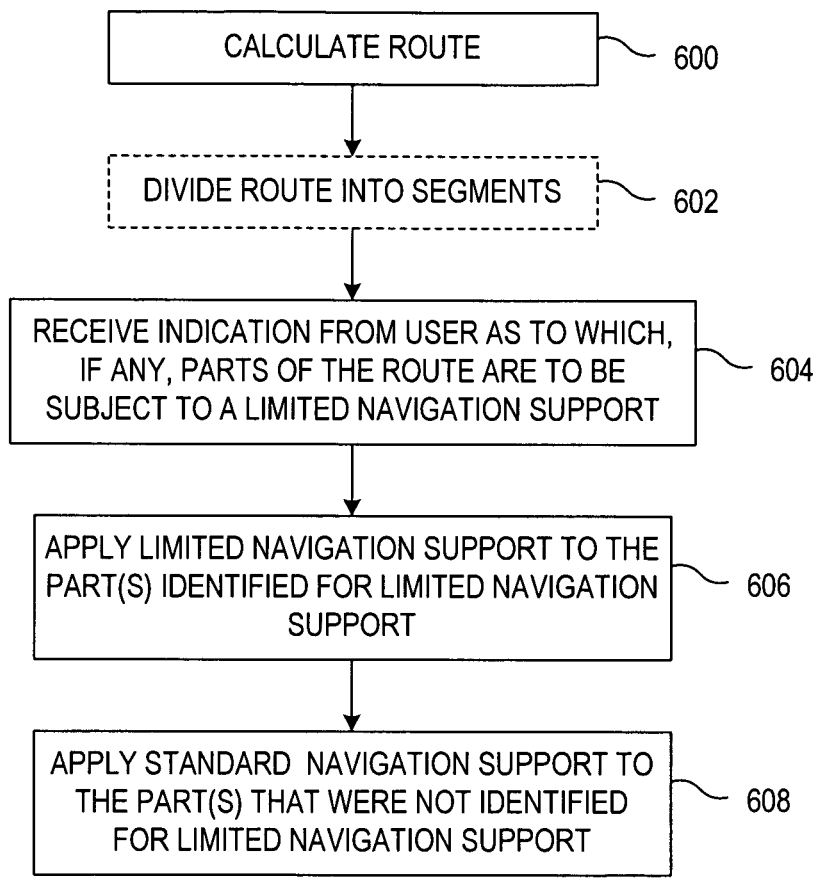
FIG. 6 is a flow diagram generally illustrating a user-influenced embodiment of managing power and/or usability of a mobile navigation device.

FIG. 6 is a flow diagram generally illustrating a user-influenced embodiment of managing power and/or usability of a mobile navigation device. The route is calculated 600 as previously described or in any known manner. In one embodiment, the route is divided 602 into segments, which may be effected based on the route complexity as previously described. Alternatively, the route may be divided into segments based on other criteria, but as by intersections, or otherwise. In yet another embodiment, the route is not divided into segments, but rather the user distinguishes some part(s) of the route in which navigation support may or may not be desired. Such an embodiment involves the user being responsible for designating one or more route portions in which navigation support will be limited, which may be accomplished by dividing at least a portion of the route into segments and selecting one or more of the segments, or by simply specifying a part(s) of the route that should be subject to the navigation support. However, in the embodiment of FIG. 6, parts of the route may be designated, or segmented, in any manner such that portions of the route are distinguishable from one another.

In the embodiment of FIG. 6 the user influences the level of navigation support applied when traveling along certain portions of the calculated route. The device receives 604 some indication as to which, if any, parts of the route the user wants to be subject to a limited navigation support. This can be accomplished by designating the route portion(s) to be subject to the navigation support, or by designating those that are to have the limited support. It should be recognized that as used herein, "limited" navigation support refers to a level of navigation support that is less than what that route part (s) would have been subjected to, had the user opted not to select this part(s) for limited navigation support. Further, "limited" navigation support in this context includes, but does not require, the possibility of providing no navigation support at all.

With this information provided by (or at least influenced by) the user, the device navigation system applies 606 the limited navigation support to that route part(s), or that segment(s), that the user identified for the limited support. Examples of such limited navigation support keeping the display turned off, reducing the display brightness, turning audio feedback off, reducing or eliminating the frequency of GPS tracking, turning tactile feedback off, suspending online route guidance services, etc. In one embodiment, all navigation feedback provided visually, audibly and/or through tactile feedback is turned off while the user travels along the route part(s) subject to limited navigation support, but at least some GPS tracking is performed so the navigation system knows when the user is approaching and/or reaches a route part where navigation support is again to be utilized.

For route parts not identified by the user as being subject to the limited navigation support, the standard navigation support for that route part(s) is applied 608. "Standard" navigation support in this context refers to what the navigation support would normally be for each respective part assuming the user does not designate that part(s) as a part of the route for limited navigation support. For example, if the route has a default level of navigation support, then the "standard" navigation support would be that default level. As another example, if some or all of divided segments are accorded different levels of navigation support based on the route being divided as a function of the route complexity, then those segment-based levels of navigation support represents the "standard" navigation support.

Figure 7:
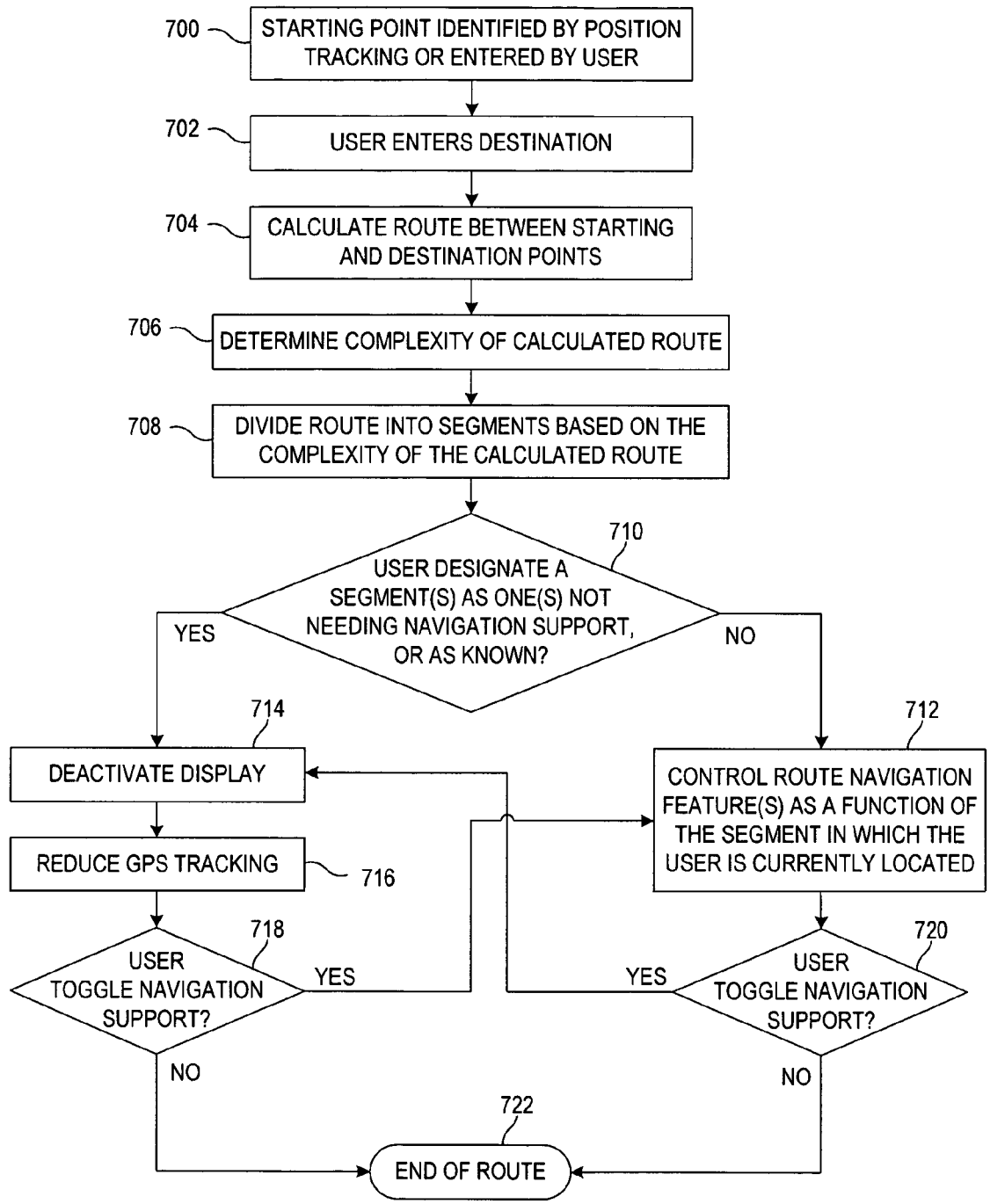
FIG. 7 is a flow diagram illustrating various representative embodiments of a method for facilitating user-influenced navigation support in accordance with the invention.

FIG. 7 is a flow diagram illustrating various representative embodiments of a method for facilitating user-influenced navigation support in accordance with the invention. The starting point is identified 700 by position tracking or entered by the user, and the user enters 702 the destination. The route is calculated 704 between the starting and destination points. In the embodiment of FIG. 7 the complexity of the route is calculated 706, and the route is divided 708 into multiple segments based on the complexity of the calculated route. While this embodiment depicts the division of the route into segments, it is equally applicable to embodiments where the user has identified one or more parts of the route to be subject to (or not subject to) navigation support, independent of having the route divided into segments. Thus, for purposes of the description of FIG. 7, reference to "segments" also includes parts of the route that may be specified by the user, whether or not any segmentation of the route occurs in addition to the user's specification of such route parts.

If the user has not designated 710 any segments as a segment(s) that is known or otherwise does not need navigation support, route navigation features are subjected to a standard level of navigation support. In the illustrated embodiment, the standard level of navigation support is to control 712 route navigation features as a function of the segment in which the user is currently located, where one or more of those segments arose due to their differing complexities. In other words, the flow from blocks 700, 702, 704, 706, 708, 710 and 712 operates analogously to the flow diagram of FIG. 4.

If the user did designate 710 any segments as known or otherwise not requiring navigation support, one or more actions are performed to provide limited navigation support—i.e. to reduce the navigation support provided to the user. Examples include deactivating 714 the display and reducing 716 GPS tracking. As for reducing GPS tracking, this may involve increasing the velocity-dependent tracking intervals, yet still enables the navigation system to reactivate when a segment subject to standard navigation support is reached. Additional and/or different actions may be taken to limit the navigation support, such as deactivating tactile feedback, deactivating audio feedback, reducing the display brightness, etc. In one embodiment, the limiting of navigational functions represent a "sleep mode" where the navigation processing in general is suspended until the appropriate change wakes the navigation processing functions.

In one embodiment, the user can toggle the navigation support feature in addition to, or in lieu of, initially designating the segment(s) as known or otherwise not requiring navigation support. For example, if the device is in a limited navigation support mode at block 716, the user can toggle 718 the navigation support to return to block 712 where the following segments on the route are controlled as a function of the route complexity and the segment in which the user is located. Similarly, if and when the device is in the standard navigation support mode at block 712, the user can toggle 720 the navigation support to perform the navigation support limiting functions 714, 716. Using the toggle feature, the user can effect a "guide me from here" function at any desired point along the route. Eventually the user reaches the end of the route 722, and navigation processing is complete.

Figure 8:
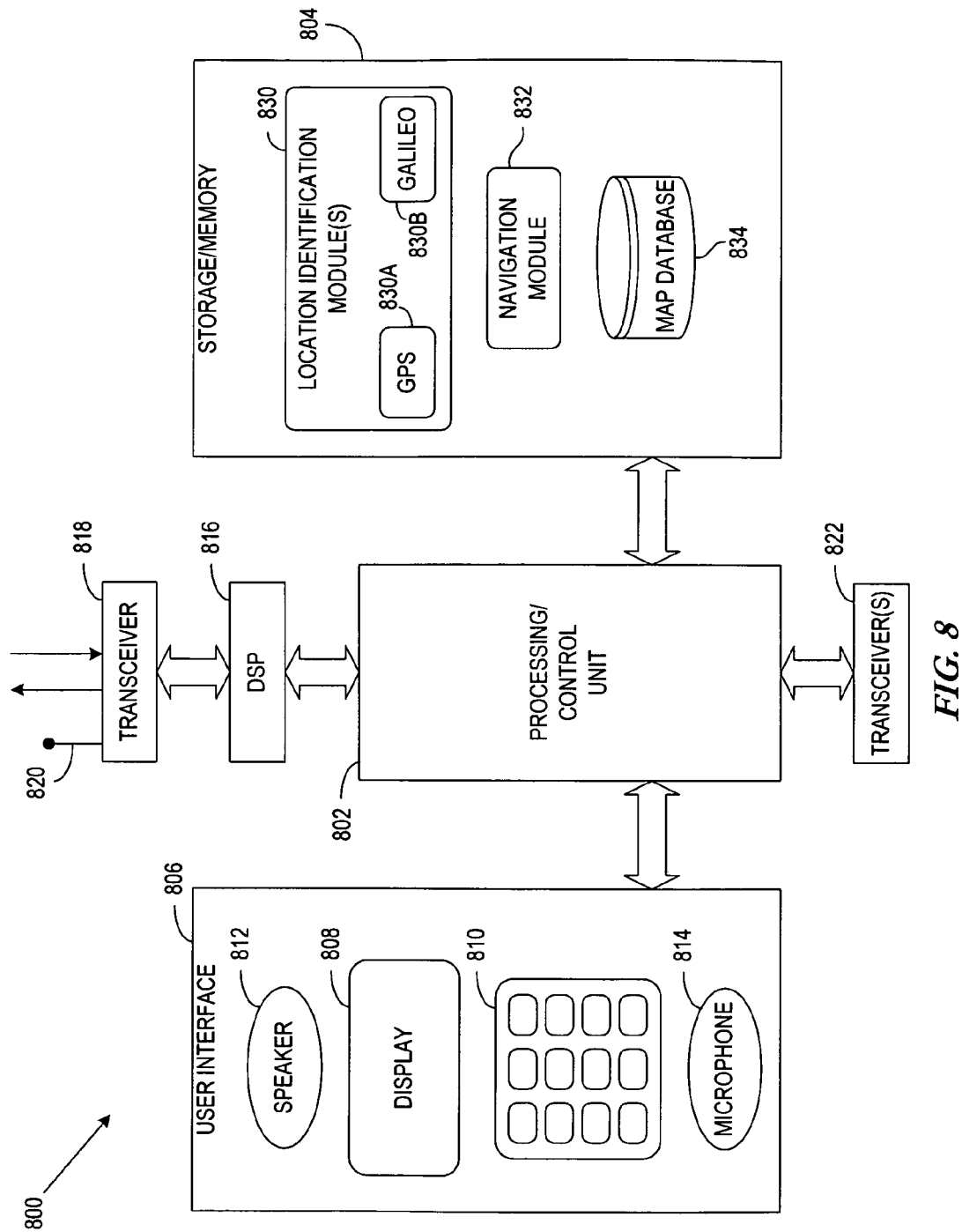
FIG. 8 depicts an exemplary mobile device capable of carrying out operations in accordance with the invention.

The mobile devices described in connection with the present invention may be represented by any number of wireless devices such as wireless/cellular telephones, personal digital assistants (PDAs), or other wireless handsets, as well as portable computing devices capable of wireless navigation. The mobile devices utilize computing systems to control and manage the conventional device activity as well as the functionality provided by the present invention. Hardware, firmware, software or a combination thereof may be used to perform the various functions and operations described herein. An example of a representative mobile device computing system capable of carrying out operations in accordance with the invention is illustrated in FIG. 8.

The exemplary mobile computing arrangement 800 suitable for performing the navigational features of the present invention is a mobile phone or other mobile communication device. The exemplary device includes a processing/control unit 802, such as a microprocessor, reduced instruction set computer (RISC), or other central processing module. The processing unit 802 need not be a single device, and may include one or more processors. For example, the processing unit may include a master processor and one or more associated slave processors coupled to communicate with the master processor.

The processing unit 802 controls the basic functions of the mobile device as dictated by programs available in the program storage/memory 804. Thus, the processing unit 802 executes the functions associated with at least the management of navigation functions. More particularly, the program storage/memory 804 may include an operating system and program modules for carrying out functions and applications on the mobile device. For example, the program storage may include one or more of read-only memory (ROM), flash ROM, programmable and/or erasable ROM, random access memory (RAM), subscriber interface module (SIM), wireless interface module (WIM), smart card, disk, CD-ROM, DVD, or other resident or removable memory device. The agent(s) or other software operable with the processing unit 802 to perform functions in accordance with the invention may also be transmitted to the mobile computing arrangement 800 via data signals, such as being downloaded electronically via a network, such as the Internet.

The processor 802 is also coupled to user-interface 806 elements associated with the mobile device. The user-interface 806 of the mobile device may include, for example, a display 808 such as a liquid crystal display, a keypad 810, speaker 812, and microphone 814. These and other user-interface components are coupled to the processor 802 as is known in the art. The exemplary keypad 810 includes alphanumeric keys for performing a variety of functions, including dialing numbers and executing operations assigned to one or more keys. Alternatively, other user-interface mechanisms may be employed, such as voice commands, switches, touch pad/screen, graphical user interface using a pointing device, trackball, joystick, and/or any other user interface mechanism.

The mobile computing arrangement 800 may also include a digital signal processor (DSP) 816. The DSP 816 may perform a variety of functions, including analog-to-digital (A/D) conversion, digital-to-analog (D/A) conversion, speech coding/decoding, encryption/decryption, error detection and correction, bit stream translation, filtering, etc. The transceiver 818, generally coupled to an antenna 820, transmits and receives the radio signals associated with the wireless device in the case of mobile voice and/or data communications. The computing arrangement 800 may also include a transceiver or other interface 822 for GPS or other positioning technology communication.

The program storage/memory 804 stores the various client programs and data used in connection with the present invention. The program storage/memory may include one or more location identification modules 830 to process GPS or other positioning technology information. Examples of such modules 830 include a GPS module 830A or Galileo module 830B (or other positioning technology module).

The storage/memory 804 also includes a navigation module 832 capable of presenting maps/routes and performing the navigation system functions described herein. The illustrated program storage/memory 804 may also include a map database or other storage 834 that includes the maps on which the routes can be created. Alternatively, the map database may be a remote database accessible to the device 800, for example, via the transceiver 818.

These and other modules may be separate modules operable in connection with the processor 802, may be a single module performing each of these functions, or may include a plurality of such modules performing the various functions. In other words, while the modules are shown as multiple software/firmware modules, these modules may or may not reside in the same software/firmware program. It should also be recognized that one or more of these functions may be performed via hardware. These modules are representative of the types of functional and data modules that may be associated with a mobile device in accordance with the invention, and are not intended to represent an exhaustive list. Also, other functions not specifically shown but otherwise described herein may be implemented by the processor 802.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile computing environments. For example, the programs and/or data may be stored in a variety of manners, may be operable on a variety of processing devices, and may be operable in mobile devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "computer program product," "modules," and the like as used herein are intended to encompass a computing device-executable program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method comprising:
   calculating a route between a starting point and a destination point;

determining a complexity of the route, wherein the complexity is based at least in part on one or more of at least one predetermined complexity profile and at least one complexity factor specified by a user;

dividing the route into a plurality of segments, wherein each segment is based at least in part on a complexity of the segment, and the complexity of the segment is based on the determined complexity of the route; and controlling at least one route navigation feature as a function of the complexity of the segment that corresponds to a current location.

2. The method of claim 1, further comprising facilitating user identification of one or more of the segments in which the controlling of the at least one route navigation feature is overridden and one or more of the navigation features are functionally reduced.

3. The method of claim 1, further comprising facilitating user identification of one or more of the segments in which the controlling of the at least one route navigation feature is overridden and one or more of the navigation features are functionally suspended.

4. The method of claim 1, further comprising:
determining the complexity of the calculated route by identifying a plurality of route types along the calculated route, and wherein dividing the route comprises designating each of the segments as a portion of the calculated route having a contiguous, common route type.

5. The method of claim 1, wherein dividing the route into the plurality of segments based on the complexity of the calculated route comprises:
determining the complexity of the calculated route by identifying distinguishable route types along the calculated route; and
grouping substantially contiguous spans of the route having common route types to form each of the segments of the calculated route.

6. The method of claim 1, wherein dividing the route into the plurality of segments comprises dividing the route into the plurality of segments based on an extent of curvature of the calculated route.

7. The method of claim 1, further comprising:
identifying an extent of curvature along the calculated route;
determining the complexity of the calculated route by establishing distinguishable levels of the curvature along the calculated route; and
wherein dividing the route into the plurality of segments based on the complexity of the calculated route comprises dividing the route into substantially contiguous segments corresponding to the established distinguishable levels of the curvature.

8. The method of claim 1, wherein dividing the route into the plurality of segments comprises dividing the route into the plurality of segments based on a quantity of intersections traversing the calculated route.

9. The method of claim 1, wherein controlling the at least one route navigation feature comprises deactivating one or more route presentation or generation features on a segment-by-segment basis.

10. The method of claim 1, wherein controlling the at least one route navigation feature comprises controlling operation of a display.

11. The method of claim 10, wherein controlling operation of the display comprises one of turning the display off or reducing its brightness.

12. The method of claim 11, further comprising utilizing an audio interface when the display is turned off.

13. The method of claim 1, wherein controlling the at least one route navigation feature comprises at least reducing the power consumption of components involved in the at least one navigation feature.

14. The method of claim 1, wherein controlling the at least one route navigation feature comprises increasing a time interval between positioning system tracking operations.

15. The method of claim 1, wherein controlling the at least one route navigation feature comprises controlling processing resources involved in presenting the calculated route to a user.

16. The method of claim 1, further comprising placing visual indicia along the route, wherein a quantity of the visual indicia placed in each segment is proportional to the complexity of the calculated route at the respective segment.

17. The method of claim 1, further comprising:
calculating user velocity; and
performing GPS location updates at a rate proportional to the velocity of the user.

18. A method comprising:
calculating a route between a starting point and a destination point;
receiving a user-specified identification of one or more parts of the route to be subject to limited navigation support;
applying the limited navigation support to the one or more parts identified for the limited navigation support; and
applying a standard navigation support to the one or more parts not identified for the limited navigation support.

19. The method of claim 18, further comprising dividing the route into a plurality of segments, and wherein receiving the user-specified identification of the one or more parts of the route comprises receiving the user-specified identification of the one or more of the plurality of segments to be subject to the limited navigation support.

20. The method of claim 19, wherein dividing the route comprises dividing the route into the plurality of segments based on a complexity of the calculated route, and wherein applying a standard navigation support is based on the complexity of the respective segment.

21. The method of claim 18, wherein receiving the user-specified identification of the one or more parts of the route comprises receiving user-specified identification of the one or more parts of the route to be subject to the limited navigation support during the user's movement along the route.

22. The method of claim 18, wherein applying the limited navigation support comprises at least deactivating a display that presents the route.

23. The method of claim 18, further comprising facilitating user entry of the user-specified identification of the one or more parts of the route that are to be subject to the limited navigation support.

24. The method of claim 18, further comprising facilitating user-controlled toggling between applying the limited navigation support and the standard navigation support.

25. The method of claim 18, wherein applying the limited navigation support comprises suspending operation of a display for navigating the route.

26. The method of claim 18, wherein applying the limited navigation support comprises reducing a brightness of a visual presentation on a display for navigating the route.

27. The method of claim 18, wherein applying the limited navigation support comprises reducing the power consumption of components involved in the at least one navigation feature.

28. The method of claim 18, wherein applying the limited navigation support comprises reducing or suspending navigation feedback associated with the at least one navigation feature.

29. The method of claim 18, wherein applying the limited navigation support comprises increasing a time interval between positioning system tracking operations.

30. An apparatus comprising:
at least one processor; and
at least one memory including computer program code for one or more programs,
the at least one memory and the computer program code configured to, with the at least one processor, cause the apparatus to perform at least the following,
facilitate user entry of at least a route destination;
calculate a route between a route origin and the route destination,
determine a complexity of the route, wherein the complexity is based at least in part on one or more of at least one predetermined complexity profile and at least one complexity factor specified by a user;
divide the route into a plurality of segments, wherein each segment is based at least in part on a complexity of the segment, and the complexity of the segment is based on the determined complexity of the route;
determine a user's location along the route; and
control at least one route navigation feature as a function of the complexity of the segment in which the user is currently located.

31. The apparatus as in claim 30, wherein the complexity of the route is determined by identifying a plurality of route types along the calculated route, and the route is divided by designating each of the segments as a portion of the calculated route having a contiguous, common route type.

32. The apparatus as in claim 30, wherein the route is divided into the plurality of segments based on an extent of curvature of the calculated route.

33. The apparatus as in claim 30, wherein the user's location is determined via a global positioning module configured to communicate with global positioning system infrastructure to identify the location of the user as a function of latitude and longitude.

34. The apparatus as in claim 30, wherein the apparatus is further caused to:
display at least the calculated route and the user's location, wherein the at least one route navigation feature includes the display of the calculated route and the user's location, and wherein the display is controlled as a function of the segment in which the user is currently located.

35. The apparatus as in claim 30, wherein the apparatus is further caused to:
audibly present at least instructions for traveling the calculated route, wherein the at least one route navigation feature includes the presentation of the instructions, and wherein the presentation of the instructions is controlled as a function of the segment in which the user is currently located.

36. The apparatus as in claim 30, wherein the at least one route navigation feature includes position tracking along the route, and wherein the position tracking is controlled by the processor.

37. The apparatus as in claim 30, wherein the apparatus is further caused to:
establish a route origin based on the user's location, and calculate the route between the route origin and a route destination.

38. The apparatus as in claim 30, wherein the apparatus is further caused to:
facilitate user entry of the route origin.

39. An apparatus comprising:
at least one processor; and
at least one memory including computer program code for one or more programs,
the at least one memory and the computer program code configured to, with the at least one processor, cause the apparatus to perform at least the following,
calculate a route between a route origin and a route destination;
receive a user-specified identification of one or more parts of the route to be subject to limited navigation support; and
apply the limited navigation support to the one or more parts identified for the limited navigation support, and to apply a standard navigation support to the one or more parts not identified for the limited navigation support.

40. The apparatus as in claim 39, wherein the apparatus is further caused to:
divide the route into a plurality of segments.

41. The apparatus as in claim 39, wherein the user-specified identification of the one or more parts of the route to be subject to limited navigation support is received during a user's movement along the route, and wherein the apparatus is further caused to:
apply the limited navigation support or the standard navigation support depending on a state of received user-specified identifications.

42. The apparatus as in claim 39, wherein the apparatus is further caused to:
facilitate user-controlled toggling between applying the limited navigation support and the standard navigation support.

43. The apparatus as in claim 39, wherein the apparatus is further caused to:
display at least the calculated route; and
limit visual presentations of the display when the limited navigation support is applied.

44. The apparatus as in claim 39, wherein the apparatus is further caused to:
communicate information over-the-air; and
limit the communication of the information when the limited navigation support is applied.

45. A non-transitory computer readable storage medium carrying one or more sequences of one or more instructions which, when executed by one or more processors, cause an apparatus to at least perform the following steps:
calculating a route between a starting point and a destination point;
determining a complexity of the route, wherein the complexity is based at least in part on one or more of at least one predetermined complexity profile and at least one complexity factor specified by a user;
dividing the route into a plurality of segments, wherein each segment is based at least in part on a complexity of the segment, and the complexity of the segment is based on the determined complexity of the route; and
controlling at least one route navigation feature as a function of the complexity of the segment that corresponds to a current location.

46. A non-transitory computer-readable storage medium carrying one or more sequences of one or more instructions which, when executed by one or more processors, cause an apparatus to at least perform the following steps:
- calculating a route between a starting point and a destination point;
- receiving a user-specified identification of one or more parts of the route to be subject to limited navigation support;
- applying the limited navigation support to the one or more parts identified for the limited navigation support; and
- applying a standard navigation support to the one or more parts not identified for the limited navigation support.

* * * * *